United States Patent [19]

Sugawara

[11] Patent Number: 5,550,679
[45] Date of Patent: Aug. 27, 1996

[54] PROJECTION LENS APPARATUS HAVING A PLURALITY OF LENS GROUPS TO PERFORM ZOOMING

[75] Inventor: Saburo Sugawara, Kawasaki, Japan

[73] Assignee: Canon Kabushiki Kaisha, Tokyo, Japan

[21] Appl. No.: 262,664

[22] Filed: Jun. 20, 1994

[30] Foreign Application Priority Data

Jun. 25, 1993 [JP] Japan .................................. 5-179928

[51] Int. Cl.$^6$ .................................................. G02B 15/14
[52] U.S. Cl. ............................................................. 359/689
[58] Field of Search ................................. 359/689, 683, 359/685, 686, 687

[56] References Cited

U.S. PATENT DOCUMENTS

4,838,666  6/1989  Shiraishi .................. 359/689

Primary Examiner—Georgia Y. Epps
Assistant Examiner—Dawn-Marie Bey
Attorney, Agent, or Firm—Fitzpatrick, Cella, Harper & Scinto

[57] ABSTRACT

A projection lens apparatus has, in order from the side of a first conjugate point of a longer distance to the side of a second conjugate point of a shorter distance, a first lens group having a negative refracting power, a second lens group having a positive refracting power, and a third lens group having a positive refracting power. A focus change from a position of a short focus end to a long focus end is made by monotonously moving the first and second lens groups toward the first conjugate point.

18 Claims, 9 Drawing Sheets

SPHERICAL ABERRATION  ASTIGMATISM  DISTORTION (%)  CHROMATIC ABERRATION

FIG.5A  FIG.5B  FIG.5C  FIG.5D
F4.1  ω=22.3°  ω=22.3°  ω=22.3°

SPHERICAL ABERRATION  ASTIGMATISM  DISTORTION (%)  CHROMATIC ABERRATION

FIG.6A
F4.6

-1.00   1.00
SPHERICAL ABERRATION

FIG.6B
ω=17.3°

-1.00   1.00
ASTIGMATISM

FIG.6C
ω=17.3°

-3.00   3.00
DISTORTION (%)

FIG.6D
ω=17.3°

-0.10   0.10
CHROMATIC ABERRATION

FIG.7A
F3.6

-1.00   1.00
SPHERICAL ABERRATION

FIG.7B
ω=28.5°

-1.00   1.00
ASTIGMATISM

FIG.7C
ω=28.5°

-3.00   3.00
DISTORTION (%)

FIG.7D
ω=28.5°

-0.10   0.10
CHROMATIC ABERRATION

SPHERICAL ABERRATION | ASTIGMATISM | DISTORTION (%) | CHROMATIC ABERRATION

SPHERICAL ABERRATION | ASTIGMATISM | DISTORTION (%) | CHROMATIC ABERRATION

FIG.10A  FIG.10B  FIG.10C  FIG.10D
F3.8    ω=28.5°  ω=28.5°  ω=28.5°

SPHERICAL ABERRATION / ASTIGMATISM / DISTORTION (%) / CHROMATIC ABERRATION

FIG.11A  FIG.11B  FIG.11C  FIG.11D
F4.3    ω=22.4°  ω=22.4°  ω=22.4°

SPHERICAL ABERRATION / ASTIGMATISM / DISTORTION (%) / CHROMATIC ABERRATION

-1.00    1.00
SPHERICAL
ABERRATION

ω=17.3°

-1.00    1.00
ASTIGMATISM

ω=17.3°

-3.00    3.00
DISTORTION (%)

ω=17.3°

-0.10    0.10
CHROMATIC
ABERRATION

PROJECTION LENS APPARATUS HAVING A PLURALITY OF LENS GROUPS TO PERFORM ZOOMING

BACKGROUND OF THE INVENTION

1. Field of the Invention

This invention relates to a zoom lens and, more particularly, to a zoom lens suitably used in a liquid crystal projector to magnify and project an image, e.g., image information displayed by a liquid crystal display device or the like, onto a screen.

2. Description of the Related Art

Various projection-type display apparatuses have been provided that are arranged to project an image onto a screen in such a manner that a plurality of images formed by liquid crystal light bulbs or the like, and having color information, are illuminated with predetermined color light, are optically superposed on each other, and the superposed image is projected onto the screen.

Figure 13:
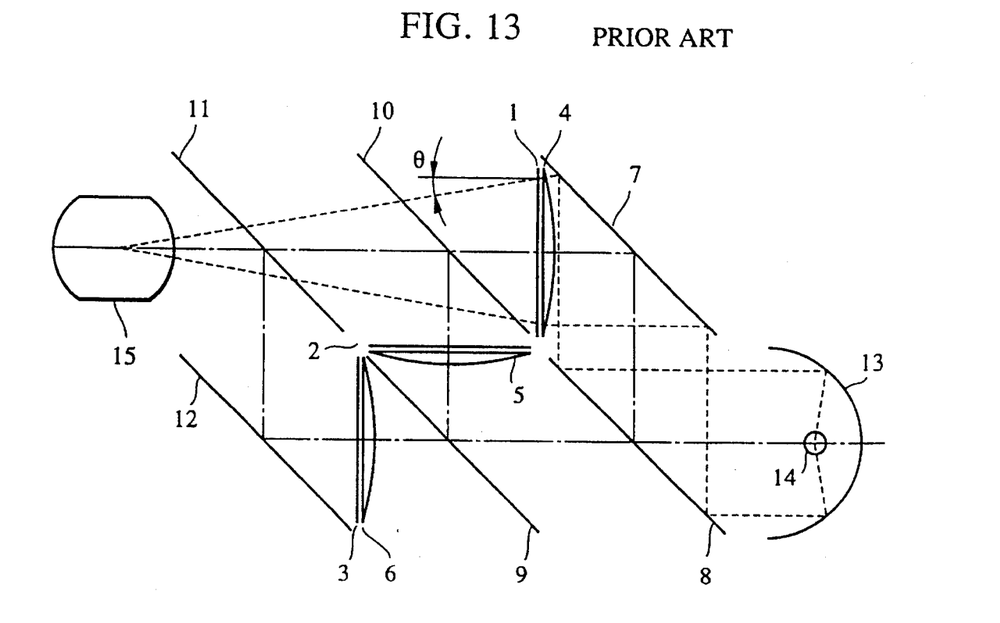
FIG. 13 is a schematic diagram of an optical system of a conventional color liquid crystal projector.

FIG. 13 is a schematic diagram of an optical system of a conventional projection display apparatus.

As shown in FIG. 13, liquid crystal display devices such as, e.g., liquid crystal light bulbs 1, 2, and 3, are provided and have surfaces on which images (black-and-white images) are formed on the basis of predetermined color information.

A light beam from a white light source 14 is separated into color light beams having colors in accordance with the color information, e.g., red (R), green (G) and blue (B), by dichroic mirrors 8 and 9. The liquid crystal light bulbs 1, 2, and 3 having images on the basis of the color information are irradiated with the corresponding color light (the color light for the liquid crystal light bulb 1 traveling via a total reflection mirror 7) by using condenser lenses 4, 5, and 6.

The light beam from the liquid crystal light bulb 3 travels to a dichroic mirror 11 through an optical path bent by a total reflection mirror 12, while the light beams from the liquid crystal light bulbs 1 and 2 travel to the dichroic mirror 11 via a dichroic mirror 10. The dichroic mirror 11 combines these light beams to form a color image on the basis of the color light of three colors, i.e., red, green and blue. The color image is projected onto a screen (not shown) by a projection lens 15.

In the projection display apparatus shown in FIG. 13, light which illuminates a peripheral portion of each of the liquid crystal display devices 1, 2, and 3 is incident upon the liquid crystal display device at a large angle. There is, therefore, a problem of a contrast non-uniformity through the display surface of each liquid crystal display device. There is also a problem of the rate of an opening area of each liquid crystal display device being reduced with an increase in the number of pixels of the liquid crystal display device.

Figure 14:
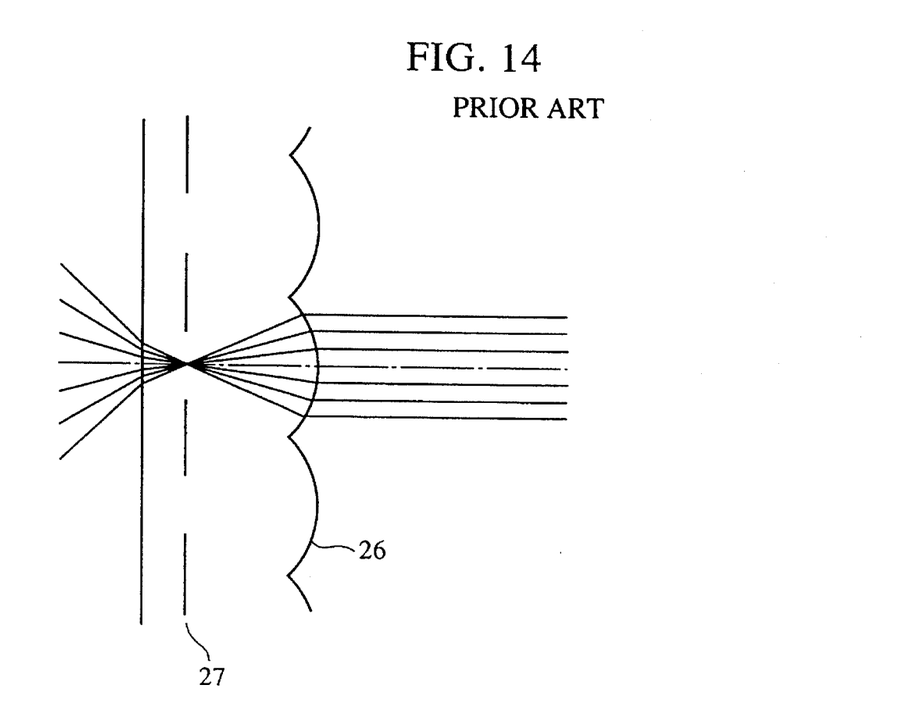
FIG. 14 is a diagram of a conventional liquid crystal display device having a micro lens array.

A liquid crystal display device member has been provided that has a micro lens array 26 facing pixels 27, as shown in FIG. 14, to improve the contrast uniformity and the rate of opening area of the liquid crystal display devices.

Figure 15:
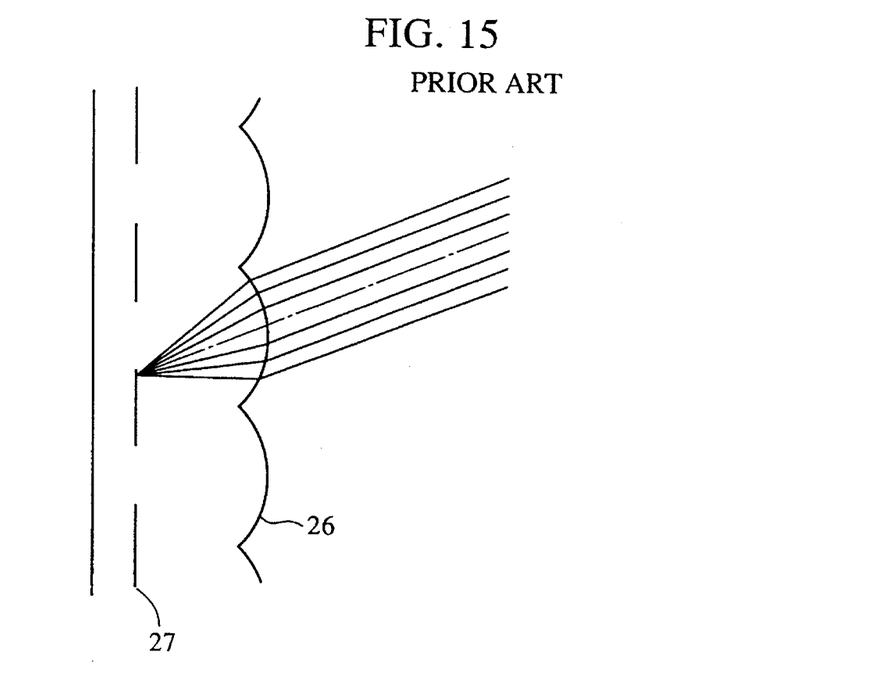
FIG. 15 is a diagram of the conventional liquid crystal display device having a micro lens array.

Such a liquid crystal display device member having a micro lens array, however, entails a problem of a kind of vignetting of a light beam, such as that shown in FIG. 15, unless the light beam is incident upon the liquid crystal device approximately perpendicularly, or if the telecentricity of the projection lens is reduced.

SUMMARY OF THE INVENTION

An object of the present invention is to provide a zoom lens which is formed of three lens groups as a whole and in which the lens groups are moved or arranged so as to efficiently condense a light beam traveling generally perpendicularly from a projected image on a liquid crystal display, or the like, and illuminated generally perpendicularly through the entire image area, and so as to obtain a bright and high-quality projected image on a predetermined plane.

To achieve this object, according to the present invention, there is provided a zoom lens comprising, in order from the side of a first conjugate point of a longer distance, a first lens group having a negative refracting power, a second lens group having a positive refracting power, and a third lens group having a positive refracting power. When zooming from a short focal length (W) to a long focal length (T) end is performed, the first and second lens groups are moved toward the first conjugate point in such a manner that the axial air spacing distance between the first and second lens groups is reduced.

Specifically, if the focal length of the entire lens system when the lens system is positioned at the short focus end is fw and the axial air space or distance between the second and third lens groups is DD2w, then a condition:

$$1.6 < DD2w/fw < 2.5$$

is satisfied.

These and other objects, features and advantages of the present invention will become more apparent from the following detailed description of the preferred embodiment of the invention.

DESCRIPTION OF THE PREFERRED EMBODIMENT

Figure 1:
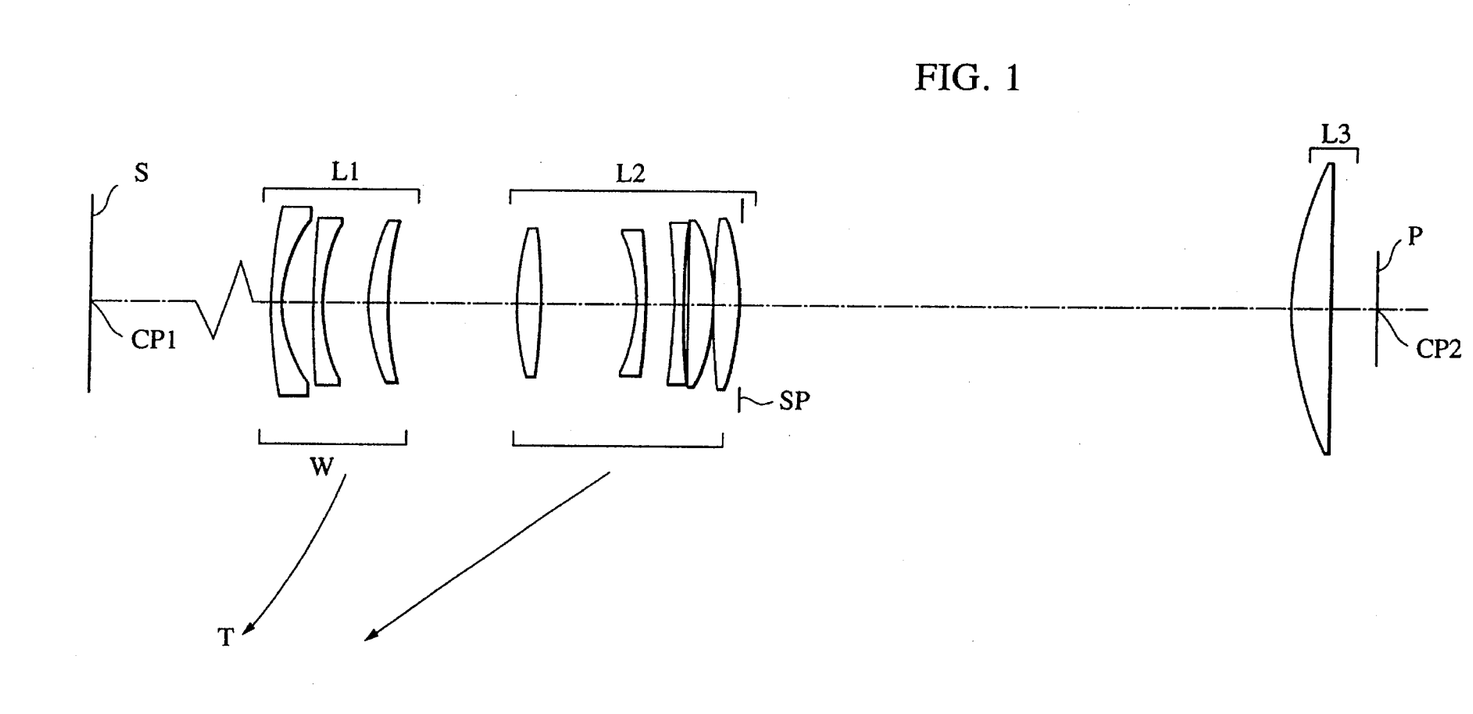
FIG. 1 is a schematic cross-sectional view of a zoom lens at a short focus end in accordance with a numerical example 1 of the present invention.
Figure 2:
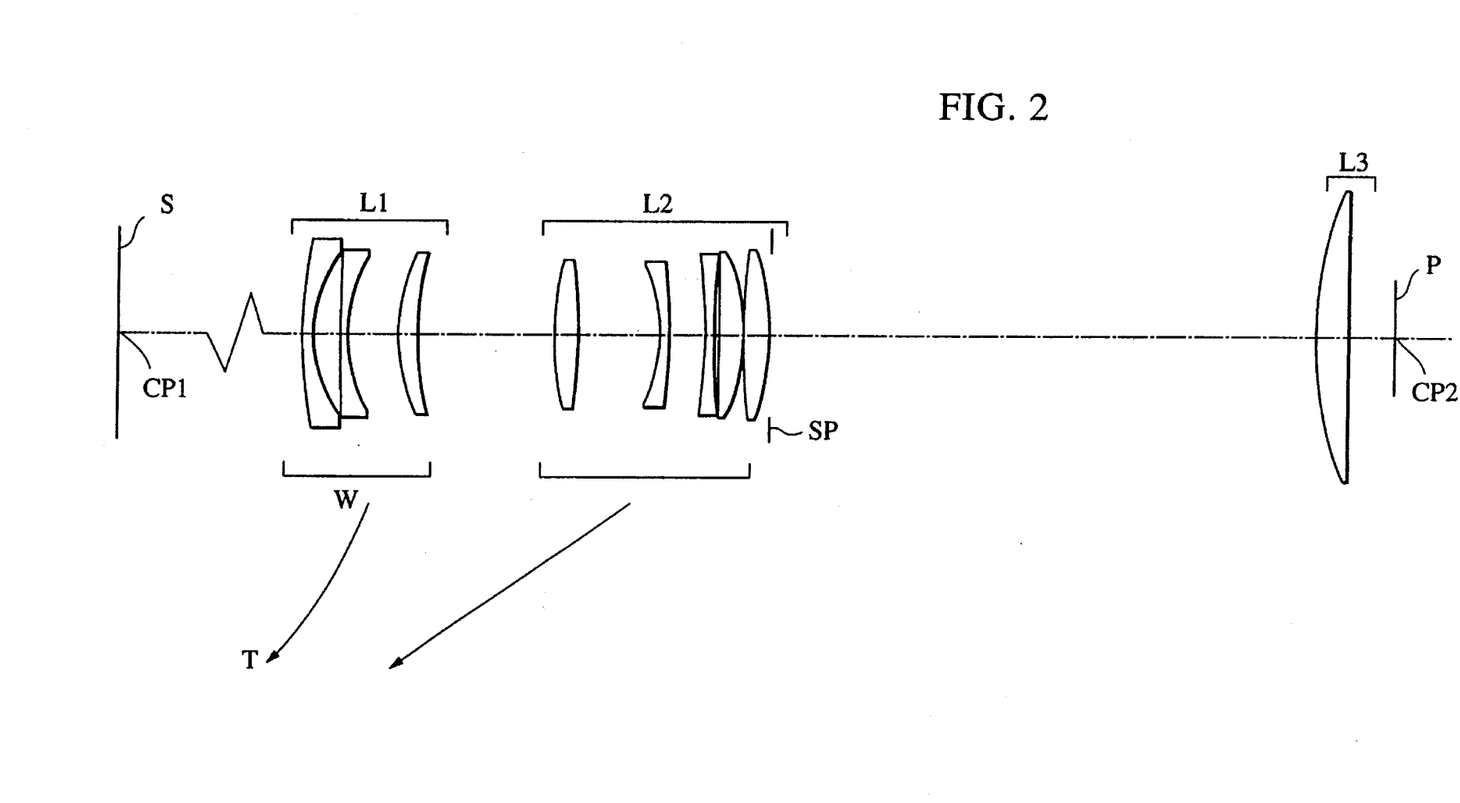
FIG. 2 is a schematic cross-sectional view of a zoom lens at a short focus end in accordance with a numerical example 2 of the present invention.
Figure 3:
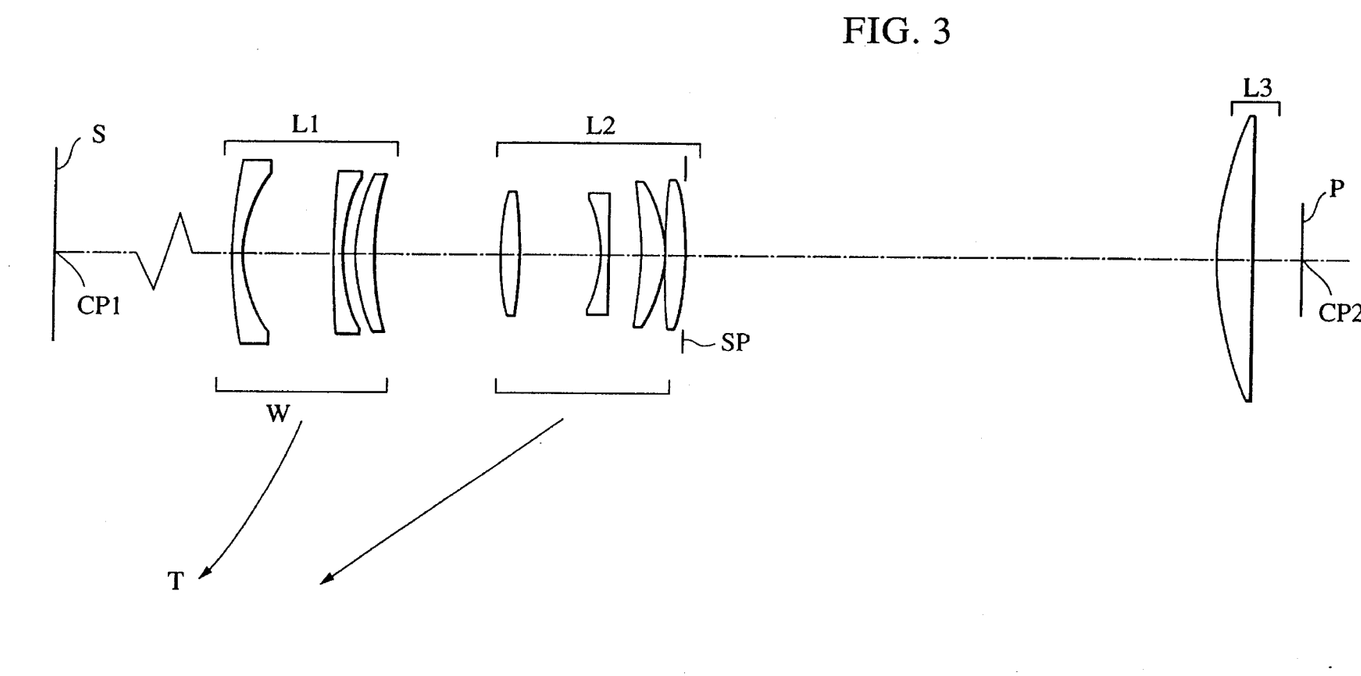
FIG. 3 is a schematic cross-sectional view of a zoom lens at a short focus end in accordance with a numerical example 3 of the present invention.
Figures 4A, 4B:
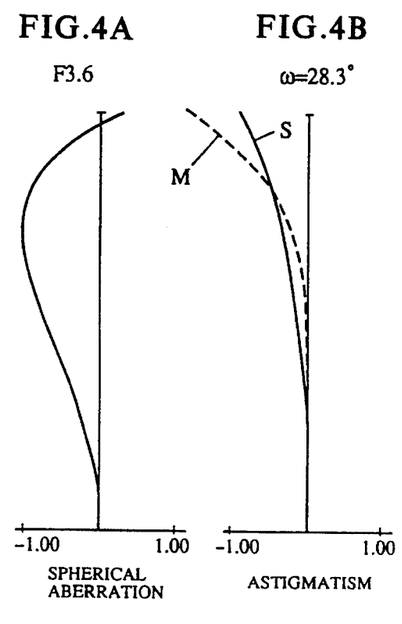
FIGS. 4A–4D are diagrams of aberrations at the short focus end of the numerical example 1 of the invention.
Figure 4C:
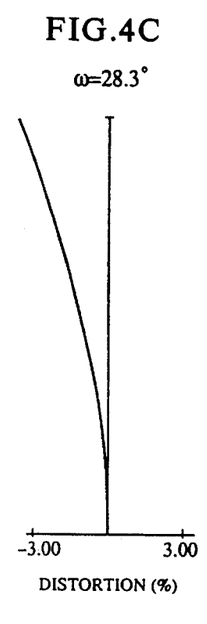
Figure 4D:
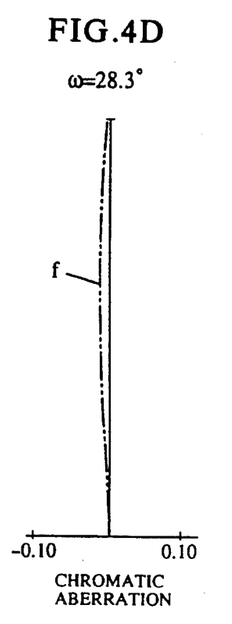
Figure 5A:
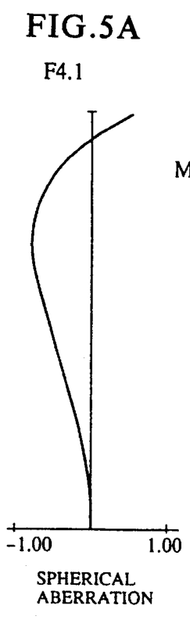
FIGS. 5A–5D are diagrams of aberrations at an intermediate position of the numerical example 1 of the invention.
Figure 5B:
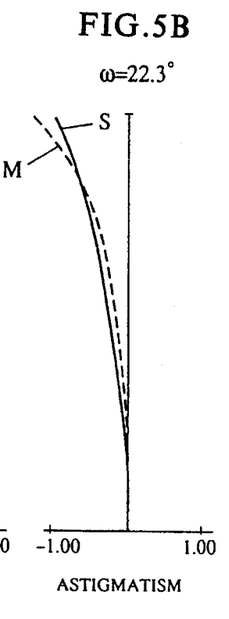
Figure 5C:
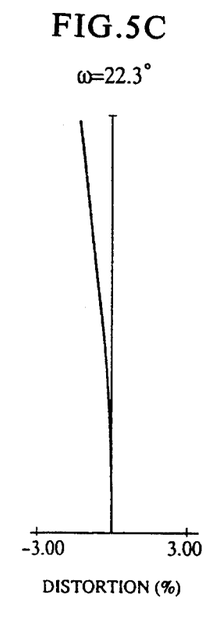
Figure 5D:
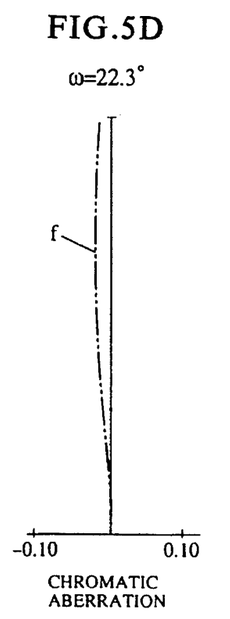
Figures 6A, 6B:
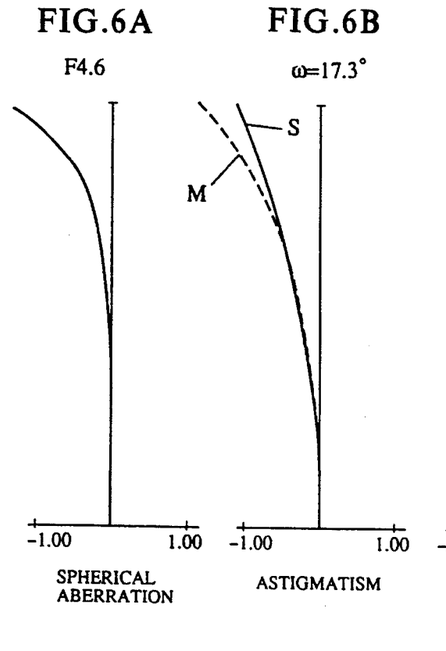
FIGS. 6A–6D are diagrams of aberrations at a long focus end of the numerical example 1 of the invention.
Figure 6C:
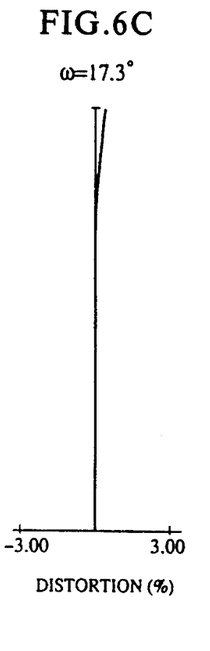
Figure 6D:
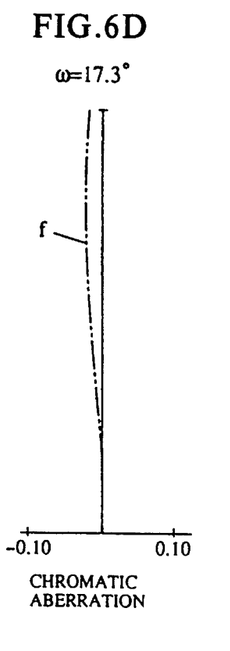
Figures 7A, 7B:
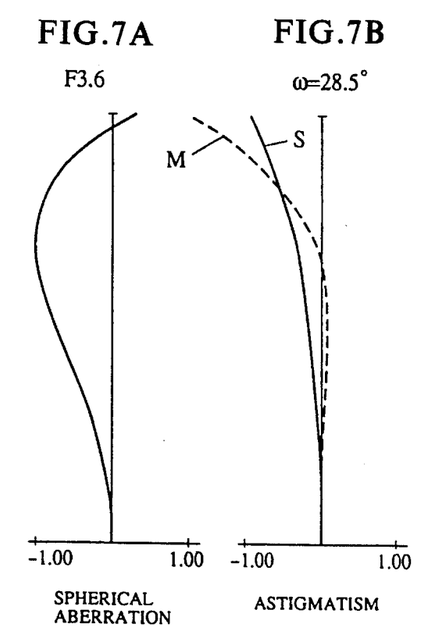
FIGS. 7A–7D are diagrams of aberrations at the short focus end of the numerical example 2 of the invention.
Figure 7C:
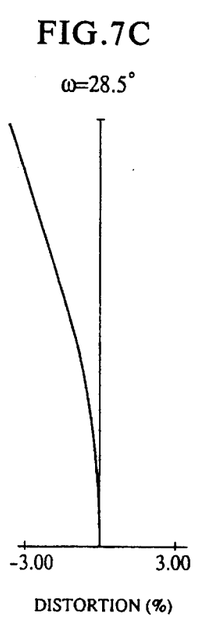
Figure 7D:
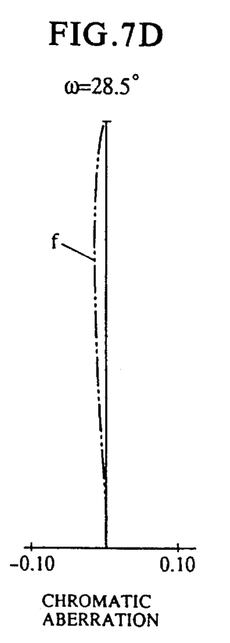
Figure 8A:
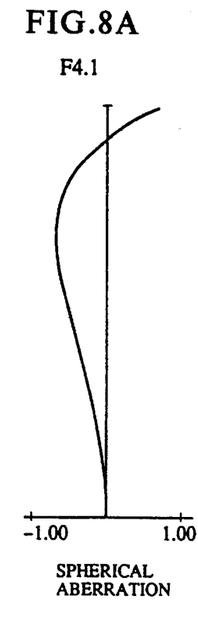
FIGS. 8A–8D are diagrams of aberrations at an intermediate position in the numerical example 2 of the invention.
Figure 8B:
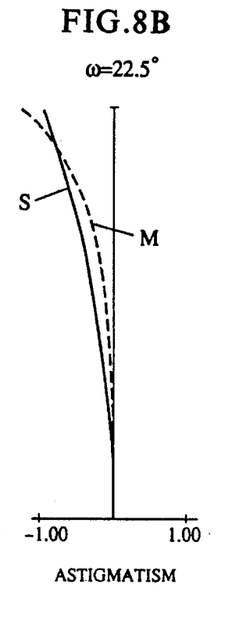
Figure 8C:
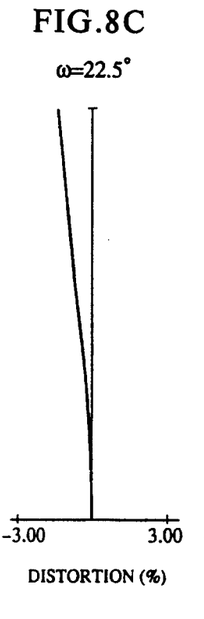
Figure 8D:
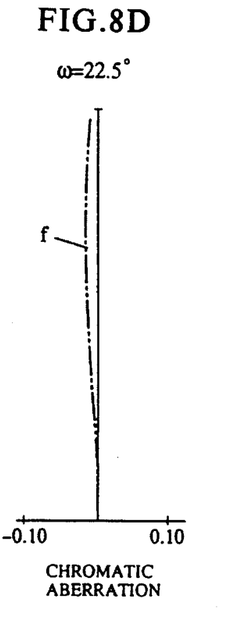
Figures 9A, 9B:
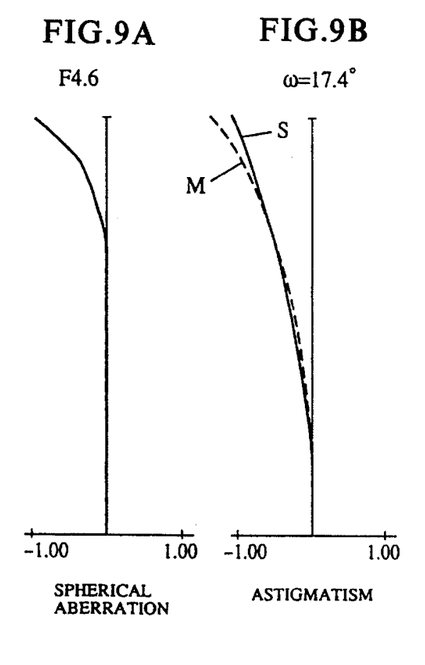
FIGS. 9A–9D are diagrams of aberrations at a long focus end in the numerical example 2 of the invention.
Figure 9C:
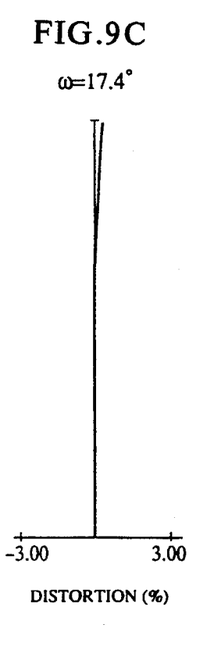
Figure 9D:
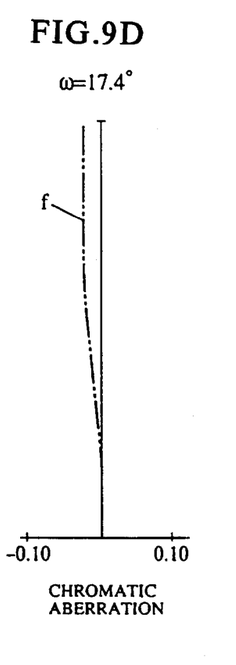
Figure 10A:
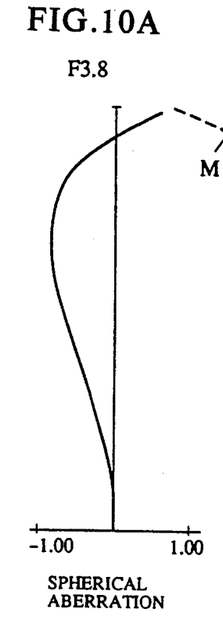
FIGS. 10A–10D are diagrams of aberrations at the short focus end in the numerical example 3 of the invention.
Figure 10B:
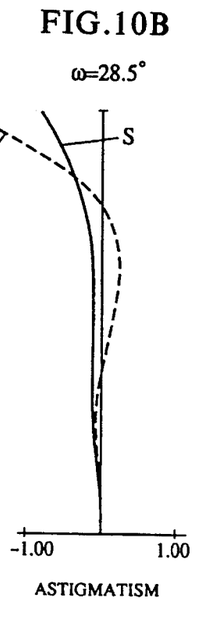
Figure 10C:
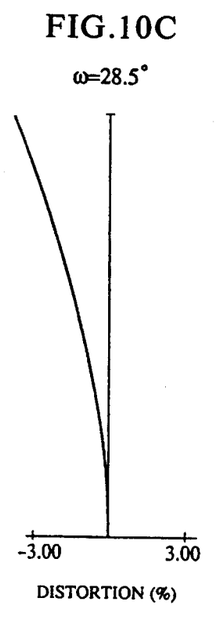
Figure 10D:
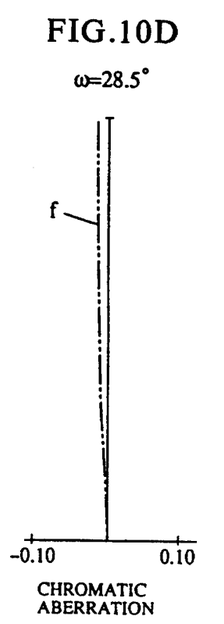
Figures 11A, 11B:
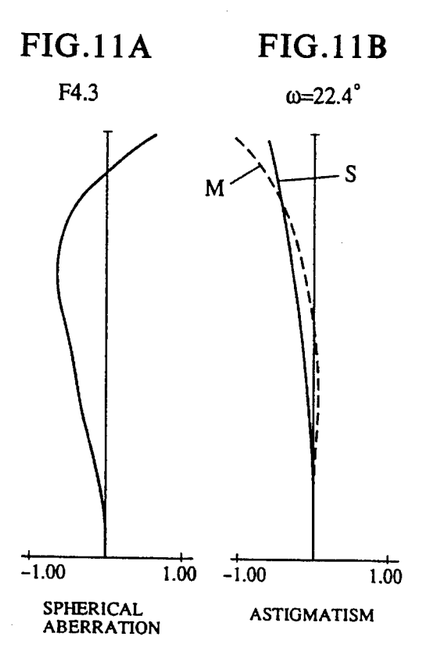
FIGS. 11A–11D are diagrams of aberrations at an intermediate position in the numerical example 3 of the invention.
Figure 11C:
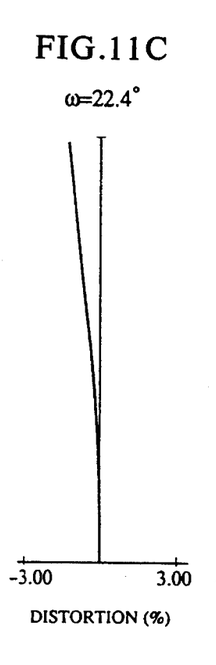
Figure 11D:
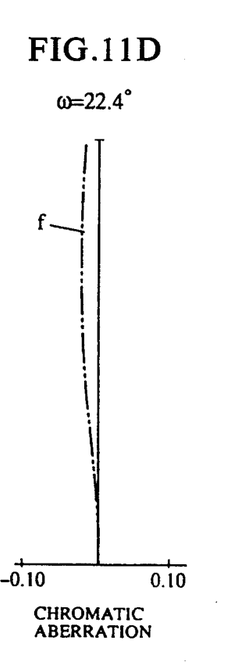
Figure 12A:
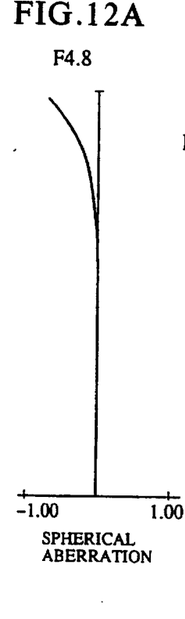
FIGS. 12A–12D are diagrams of aberrations at a long focus end in the numerical example 3 of the invention.
Figure 12B:
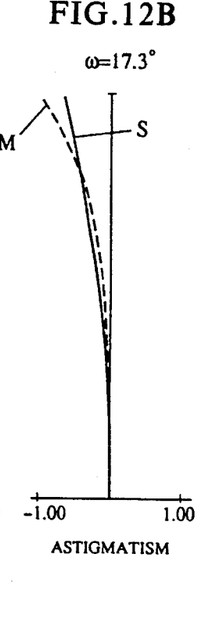
Figure 12C:
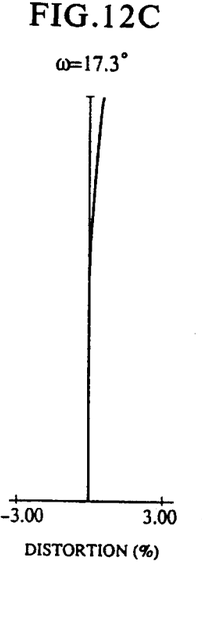
Figure 12D:
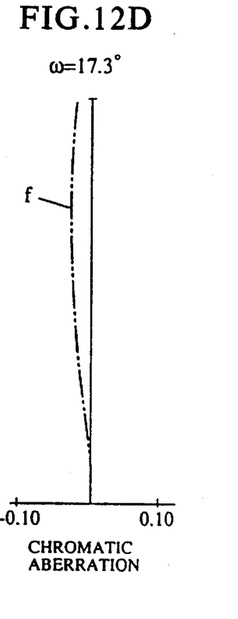

FIGS. 1 through 3 are cross-sectional views of zoom lenses in accordance with separate numerical examples of the present invention described hereinbelow, and FIGS. 4A–4D, 5A–5D 6A–6D are diagrams, respectively, of aberrations of the numerical example 1 at short-focus-end, intermediate and long-focus-end positions. FIGS. 7A–7–D, 8A–8D, and 9A–9D are diagrams, respectively, of aberrations of the numerical example 2 at short-focus-end, intermediate and long-focus-end positions. FIGS. 10A–10D, 11A–11D, and 12A–12D are diagrams, respectively, of aberrations of the numerical example 3 at short-focus-end, intermediate and long-focus-end positions. FIGS. 4A–4D depict, with F3.6 and $\omega=28.3°$, spherical aberration, astigmatism, distortion (%), and chromatic aberration, respectively. FIGS. 5A–5D depict, with F4.1 and $\omega=22.3°$, spherical aberration, astigmatism, distortion (%), and chromatic aberration, respectively. FIGS. 6A–6D depict, with F4.6 and $\omega=17.3°$, spherical aberration, astigmatism, distortion (%), and chromatic aberration, respectively. FIGS. 7A–7D depict, with F3.6 and $\omega=28.5°$, spherical aberration, astigmatism, distortion (%), and chromatic aberration, respectively. FIGS. 8A–8D depict, with F4.1 and $\omega=22.5°$, spherical aberration, astigmatism, distortion (%), and chromatic aberration, respectively. FIGS. 9A–9D depict, with F4.6 and $\omega=17.4°$, spherical aberration, astigmatism, distortion (%), and chromatic aberration, respectively. FIGS. 10A–10D depict, with F3.8 and $\omega=28.5°$, spherical aberration, astigmatism, distortion (%), and chromatic aberration, respectively. FIGS. 11A–11D depict, with F4.3 and $\omega=22.4°$, spherical aberration, astigmatism, distortion (%), and chromatic aberration, respectively. FIGS. 12A–12D depict, with F4.8 and $\omega=17.3°$, spherical aberration, astigmatism, distortion (%), and chromatic aberration, respectively.

Referring to the lens sections shown in FIGS. 1 through 3, the lens system has a first lens group L1 having a negative refracting power, a second lens group L2 having a positive refracting power, a third lens group L3 having a positive refracting power, an aperture SP, a screen plane S (projection plane), and an original image P (projected plane) on a color liquid crystal display. The screen plane S and the original image P are conjugate with each other. In general, the surface of the screen plane S corresponds to a conjugate point of a longer distance from the lens system (first conjugate point CP1), while the original image P corresponds to a conjugate point of a shorter distance from the lens system (second conjugate point CP2).

In the zoom lens of the present invention, the first lens group L1 and the second lens group L2 are moved along the optical axis to change the magnification of the lens system. In the first to third numerical examples shown in FIGS. 1 to 3, zooming from a short focus to a long focus is performed by monotonously moving the first and second lens groups so that the distance therebetween is reduced.

In this embodiment, as described above, the zoom lens includes, in order from the first conjugate point CP1 or S side, the first lens group L1 having a negative refracting power, the second lens group L2 having a positive refracting power, and the third lens group L3 having a positive refracting power. The magnification is changed from a short focal length (W) to a long focal length (T) by moving the first lens group L1 linearly or non-linearly toward the first conjugate point CP1 and also by moving the second lens group L2 toward the first conjugate point CP1, as schematically indicated by the arrows in FIGS. 1 to 3. Thus, the zoom lens is arranged to have a smaller size while maintaining a predetermined zoom ratio.

Also, as mentioned above, if the axial air spacing or distance between the second and third lens groups is DD2w and if the focal length of the entire lens system when the lens is positioned at the short focus end is fw, then a condition:

$$1.6 < DD2w/fw < 2.5 \quad (1)$$

is satisfied.

With conditional inequality (1), the ratio of the axial air distance between the second and third lens groups and the focal length of the entire lens system, when positioned at the short focus end, is determined. If the ratio is not higher than the lower limit in conditional inequality (1), the space for dichroic mirrors or the like for three-color composition using three liquid crystal display devices cannot be sufficiently large. If the ratio is not lower than the upper limit in conditional inequality (1), the overall length of the lens is considerably large.

Further, it is desirable to satisfy other conditions as described below.

That is, if the focal length of the ith lens group is fi, the focal length of the entire lens system when positioned at the short focus end is fw, and the distance between principal points of the ith and i+1th lens groups when the lens system is positioned at the short focus end is eiw, $$0.5 < -f1/f2 < 1.7 \quad (2)$$

$$0.5 < -f1/fw < 2 \quad (3)$$

$$0.5 < f2/fw < 1.5 \quad (4)$$

$$0.5 < f3/fw < 4.1 \quad (5)$$

$$0.3 < e1w/fw < 2 \quad (6)$$

The meanings of these conditional inequalities in terms of lens art will be described.

In conditional inequality (2), the ratio of the focal lengths of the first and second lens groups is limited. If this ratio is below the domain defined in conditional inequality (2), the power of the first lens group is so large that the image surface is excessively curved (overcorrected). If this ratio is above the domain defined in conditional inequality (2), the focal length of the first lens group is so large that it is difficult to reduce the focal length of the entire lens system while maintaining a large axial air distance between the second and third lens groups, and the projection distance is disadvantageously increased if the lens system is designed to obtain a large projected image.

In conditional inequality (3), the ratio of the focal lengths of the first lens group and the entire lens system, when positioned at the short focus end, is limited. If this ratio is not higher than the lower limit of conditional inequality (3), the power of the first lens group is so large that the image surface is excessively curved. If this ratio is not lower than the upper limit of conditional inequality (3), the focal length of the first lens group is so large that it is difficult to increase the principal point distance e1w between the first and second lens groups at the short focus end and, hence, to obtain the predetermined zoom ratio.

In the conditional inequality (4), the ratio of the focal lengths of the second lens group and the entire lens system, when the lens system is positioned at the short focus end, is limited. If this ratio is not higher than the lower limit of conditional inequality (4), the focal length of the second lens group is so small that the axial air distance between the second and third lens groups is insufficient. If this ratio is not lower than the upper limit of conditional inequality (4), the focal length of the second lens group is so large that the overall length of the zoom lens is disadvantageously increased.

In conditional inequality (5), the ratio of the focal lengths of the third lens group and the entire lens system, when the lens system is positioned at the short focus end, is limited. If this ratio is out of the domain defined in conditional inequality (5), the desired telecentricity is impaired.

In conditional inequality (6), the ratio of the distance between the principal points of the first and second lens groups at the short focus end and the focal length of the entire lens system at the short focus end is limited. If this ratio is not higher than the lower limit of conditional inequality (6), the desired zoom ratio cannot be set although the overall length of the zoom lens is reduced. If this ratio is not lower than the upper limit of conditional inequality (6), the overall length of the zoom lens is disadvantageously large.

The desired zoom lens of the present invention can be obtained by satisfying these conditions. However, it is preferable to satisfy further conditions as shown below in order to obtain improved optical performance through the entire zoom range and on the entire image surface.

(i) Assuming that the third lens group is formed of a positive single lens, and that the radiuses of curvature of surfaces of the single lens on the first and second conjugate point sides are R3f and R3r, respectively, it is preferable to satisfy a condition:

$$-3.1 < \frac{R3f + R3r}{R3f - R3r} < -0.3 \quad (7)$$

The third lens group is formed of a single lens to facilitate the correction of the image surface curvature. Further, the third lens group may be formed so as to be stationary with respect to the optical axis.

Conditional inequality (7) defines a condition relating to the shape of the third lens group. If the conditional inequality (7) is not satisfied at the lower limit, a distortion is overcorrected. If conditional inequality (7) is not satisfied at the upper limit, a distortion cannot be sufficiently corrected.

(ii) It is preferable for the first lens group to have, in order from the first conjugate point side, at least one negative meniscus lens having a convex surface on the first conjugate point side, and a positive meniscus lens having a convex surface on the first conjugate point side. The effective diameter of the first lens group can be effectively reduced if this lens arrangement is adopted.

(iii) It is preferable for the second lens group to have, in order from the first conjugate point side, a positive lens having two convex lens surfaces, at least one negative lens and at least one positive lens. Variations in various aberrations during zooming can be easily, suitably corrected if this lens arrangement is adopted.

(iv) Assuming that the averages of the refractive indexes of the materials of the negative and positive lenses in the first lens group are N1n and N1p, respectively, and that the averages of the refractive indexes of the materials of the negative and positive lenses in the second lens group are N2n and N2p, respectively, it is preferable to satisfy the following conditions:

$$N1n < 1.7 \quad (8)$$

$$1.7 < N1p \quad (9)$$

$$1.6 < N2n < 1.8 \quad (10)$$

$$N2p < 1.7 \quad (11)$$

In conditional inequality (8), the average of the refractive indexes of the materials of negative lenses in the first lens group is limited. If the average is above the domain defined in conditional inequality (8), the image surface curvature is overcorrected.

In conditional inequality (9), the average of the refractive indexes of the materials of positive lenses in the first lens group is limited. If the average is below the domain defined in conditional inequality (9), the image surface curvature is overcorrected, as in the case of conditional inequality (8).

In conditional inequality (10), the average of the refractive indexes of the materials of the negative lenses in the second lens group is limited. If the average is not larger than the lower limit of conditional inequality (10), the image surface curvature is not sufficiently corrected. Conversely, if the average is not smaller than the upper limit, the image surface is overcorrected.

In conditional inequality (11), the average of the refractive indexes of the materials of the positive lenses in the second lens group is limited. If the average is above the domain defined in conditional inequality (11), the image surface curvature is overcorrected.

(v) It is preferable to provide a fixed aperture between the second and third lens groups. If such a means is used, the entire lens system can be easily formed as a suitable telecentric system and flare of an off-axis light beam at the long focus end can be easily removed.

The numerical examples of the present invention are as shown below. In the following, F is the focal length, FNO is the F-stop of the lens, 2ω is the field of view in degrees, Ri is the radius of curvature of the ith lens in the order from the first conjugate point (CP1) side, Di is the thickness and the axial air spacing of the ith lens from the first conjugate point side, and Ni and vi are, respectively, the refractive index and the Abbe number of the ith lens from the first conjugate point side.

Also, the relationship between the above-described conditional inequalities and various values of the numerical examples is shown in Table 1.

| (Numerical Example 1) F = 104.92 to 167.77   FNO = 1:3.6 to 4.6   2ω = 56.7 to 33.5° | | | |
| --- | --- | --- | --- |
| R1 = 202.99 | D1 = 3.60 | N1 = 1.51633 | v1 = 64.2 |
| R2 = 57.14 | D2 = 11.45 | | |
| R3 = 734.76 | D3 = 3.20 | N2 = 1.62299 | v2 = 58.2 |
| R4 = 69.13 | D4 = 17.22 | | |
| R5 = 76.39 | D5 = 6.90 | N3 = 1.80518 | v3 = 25.4 |
| R6 = 121.92 | D6 = variable (See Table 1) | | |
| R7 = 132.71 | D7 = 8.20 | N4 = 1.65844 | v4 = 50.9 |
| R8 = −197.75 | D8 = 35.03 | | |
| R9 = −58.77 | D9 = 2.80 | N5 = 1.74077 | v5 = 27.8 |
| R10 = −217.33 | D10 = 10.05 | | |
| R11 = −190.54 | D11 = 3.10 | N6 = 1.64769 | v6 = 33.8 |
| R12 = 297.15 | D12 = 1.84 | | |

-continued (Numerical Example 1)
F = 104.92 to 167.77   FNO = 1:3.6 to 4.6   2ω = 56.7 to 33.5°

| | | | |
|---|---|---|---|
| R13 = −1548.20 | D13 = 9.65 | N7 = 1.62299 | v7 = 58.2 |
| R14 = −70.36 | D14 = 0.20 | | |
| R15 = 553.57 | D15 = 8.90 | N8 = 1.51633 | v8 = 64.2 |
| R16 = −100.82 | D16 = variable (See Table 1) | | |
| R17 = aperture | D17 = variable (See Table 1) | | |
| R18 = 140.07 | D18 = 13.50 | N9 = 1.51633 | v9 = 64.2 |
| R19 = 96193.09 | | | |

TABLE 1

| Variable | Focal length, F | | |
|---|---|---|---|
| Distance | 104.93 | 131.29 | 167.77 |
| D6 | 47.89 | 25.99 | 7.01 |
| D16 | 0.00 | 36.31 | 86.45 |
| D17 | 201.50 | 201.50 | 201.50 |

(Numerical Example 2)
F = 104.27 to 166.83   FNO = 1:3.6 to 4.6   2ω = 57.1 to 34.7°

| | | | |
|---|---|---|---|
| R1 = 154.87 | D1 = 3.60 | N1 = 1.51633 | v1 = 64.2 |
| R2 = 55.33 | D2 = 10.20 | | |
| R3 = −1307.57 | D3 = 3.20 | N2 = 1.51633 | v2 = 64.2 |
| R4 = 65.22 | D4 = 18.68 | | |
| R5 = 75.12 | D5 = 6.22 | N3 = 1.74077 | v3 = 27.8 |
| R6 = 121.27 | D6 = variable (See Table 2) | | |
| R7 = 136.24 | D7 = 7.70 | N4 = 1.66672 | v4 = 48.3 |
| R8 = −169.24 | D8 = 30.10 | | |
| R9 = −61.44 | D9 = 2.80 | N5 = 1.72825 | v5 = 28.5 |
| R10 = −194.22 | D10 = 14.19 | | |
| R11 = −139.81 | D11 = 3.10 | N6 = 1.64769 | v6 = 33.8 |
| R12 = 286.17 | D12 = 2.03 | | |
| R13 = −983.59 | D13 = 9.47 | N7 = 1.51633 | v7 = 64.2 |
| R14 = −62.80 | D14 = 0.20 | | |
| R15 = 302.61 | D15 = 8.71 | N8 = 1.51633 | v8 = 64.2 |
| R16 = −108.03 | D16 = variable (See Table 2) | | |
| R17 = aperture | D17 = variable (See Table 2) | | |
| R18 = 140.00 | D18 = 12.00 | N9 = 1.51633 | v9 = 64.2 |
| R19 = ∞ | | | |

TABLE 2

| Variable | Focal length, F | | |
|---|---|---|---|
| Distance | 104.27 | 130.34 | 166.84 |
| D6 | 49.90 | 27.31 | 7.55 |
| D16 | 0.00 | 35.01 | 86.02 |
| D17 | 198.00 | 198.00 | 198.00 |

(Numerical Example 3)
F = 104.43 to 167.09   FNO = 1:3.8 to 4.8   2ω = 57.0 to 34.7°

| | | | |
|---|---|---|---|
| R1 = 157.88 | D1 = 3.90 | N1 = 1.51633 | v1 = 64.2 |
| R2 = 49.50 | D2 = 33.53 | | |
| R3 = 549.66 | D3 = 3.10 | N2 = 1.65844 | v2 = 50.9 |
| R4 = 76.47 | D4 = 4.81 | | |
| R5 = 65.45 | D5 = 5.97 | N3 = 1.80518 | v3 = 25.4 |
| R6 = 110.57 | D6 = variable | | |

-continued (Numerical Example 3)
F = 104.43 to 167.09   FNO = 1:3.8 to 4.8   2ω = 57.0 to 34.7°

| | | | |
|---|---|---|---|
| | (See Table 3) | | |
| R7 = 131.88 | D7 = 7.13 | N4 = 1.70154 | v4 = 41.2 |
| R8 = −161.17 | D8 = 30.31 | | |
| R9 = −48.44 | D9 = 2.50 | N5 = 1.80518 | v5 = 25.4 |
| R10 = 921.44 | D10 = 12.16 | | |
| R11 = −180.91 | D11 = 9.42 | N6 = 1.62299 | v6 = 58.2 |
| R12 = −50.47 | D12 = 0.20 | | |
| R13 = 636.66 | D13 = 6.88 | N7 = 1.62299 | v7 = 58.2 |
| R14 = −144.51 | D14 = variable (See Table 3) | | |
| R15 = aperture | D15 = variable (See Table 3) | | |
| R16 = 140.00 | D16 = 12.00 | N8 = 1.51633 | v8 = 64.2 |
| R17 = ∞ | | | |

TABLE 3

| Variable | Focal length, F | | |
|---|---|---|---|
| Distance | 104.43 | 130.54 | 167.10 |
| D6 | 47.03 | 24.90 | 5.54 |
| D14 | 0.00 | 33.87 | 81.29 |
| D15 | 198.00 | 198.00 | 198.00 |

TABLE 4

| | Numerical example | | |
|---|---|---|---|
| Conditional Equation | 1 | 2 | 3 |
| (1) DD2w/fw | 1.92 | 1.90 | 1.90 |
| (2) −f1/f2 | 0.80 | 0.81 | 0.85 |
| (3) −f1/fw | 0.95 | 0.98 | 0.99 |
| (4) f2/fw | 1.20 | 1.21 | 1.17 |
| (5) f3/fw | 2.59 | 2.60 | 2.60 |
| (6) e1w/fw | 1.29 | 1.31 | 1.24 |
| (7) (R3f + R3r)/(R3f − R3r) | −1 | −1 | −1 |
| (8) N1n | 1.57 | 1.52 | 1.59 |
| (9) N1p | 1.81 | 1.74 | 1.81 |
| (10) N2n | 1.69 | 1.69 | 1.81 |
| (11) N2p | 1.60 | 1.57 | 1.61 |

According to the present invention, as described above, a zoom lens can be obtained which is formed of three lens groups as a whole and in which the lens groups are arranged so as to efficiently condense a light beam traveling generally perpendicularly from a projected image (P) generated by a liquid crystal display, or the like, and illuminated generally perpendicularly through the entire image area, and so as to obtain a bright, high-quality projected image on a predetermined plane (S).

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structure and functions.

What is claimed is:

1. A zoom lens comprising, in order from a side of a first conjugate point at a longer distance from said zoom lens to a side of a second conjugate point at a shorter distance from said zoom lens:

a first lens group having a negative refracting power;

a second lens group having a positive refracting power; and a third lens group having a positive refracting power;

wherein a zooming operation from a short focal length to a long focal length is made by monotonously moving said first lens group and said second lens group toward the first conjugate point; and wherein if the distance between said second lens group and said third lens group is DD2w and the focal length of the entire zoom lens system when the lens system is positioned at the short focus end configuration is fw, respectively, then the following condition is satisfied:

$1.6<DD2w/fw<2.5.$

2. A zoom lens according to claim 1, wherein if the focal length of the ith lens group is fi, the focal length of the entire system when positioned at the short focus end configuration is fw, the distance between principal points of the ith and i+1th lens groups when the lens system is positioned at the short focus end configuration is eiw, and the axial air distance between the ith lens group and the i+1th lens group is DDiw, then the following conditions are satisfied:

$0.5<-f1/f2<1.7,$ $0.5<-f1/fw<2,$ $0.5<f2/fw<1.5,$ $0.5<f3/fw<4.1,$ $0.3<eiw/fw<2,$ and $1.6<DD2w/fw<2.5.$ 3. A zoom lens according to claim 1, wherein said third lens group comprises a single lens.

4. A zoom lens according to claim 3, wherein if the radii of curvature of surfaces of said third lens group on the first conjugate point side and the second conjugate point side are R3f and R3r, respectively, then the following condition is satisfied:

$$-3.1 < \frac{R3f+R3r}{R3f-R3r} < -0.3.$$

5. A zoom lens according to claim 1, wherein said first lens group comprises, in order from the first conjugate point side, at least one negative meniscus lens having a convex surface on the first conjugate point side, and a positive meniscus lens having a convex surface on the first conjugate point side.

6. A zoom lens according to claim 5, wherein said second lens group comprises, in order from the first conjugate point side, a positive lens having two convex lens surfaces, at least one negative lens and at least one positive lens.

7. A zoom lens according to claim 6, wherein if the averages of the refractive indexes of the materials of the positive and negative lenses in said first lens group are N1n and N1p, respectively, and if the averages of the refractive indexes of the materials of the negative and positive lenses in said second group are N2n and N2p, then the following conditions are satisfied:

$N1n<1.7,$ $1.7<N1p,$ $1.6<N2n<1.8,$ and $N2p<1.7.$

8. A zoom lens according to claim 1, wherein a fixed aperture is provided between said second lens group and said third lens group.

9. A projection lens apparatus usable with a screen, said projection lens apparatus comprising, in order from a side where the screen is disposed:

a first lens group having a negative refracting power;

a second lens group having a positive refracting power; and a third lens group having a positive refracting power, wherein zooming is performed by changing the distances between said first lens group and said second lens group, and wherein if the distance between said second lens group and said third lens group and the focal length of the entire projection lens apparatus are DD2w and fw, respectively, when the projection lens apparatus is positioned at a short focus end configuration, then the following condition is satisfied:

$1.6<DD2w/fw<2.5.$

10. A projection lens apparatus according to claim 9, wherein said third lens group is stationary with respect to an optical axis.

11. A projection lens apparatus according to claim 10, wherein said first lens group and said second lens group are monotonously moved toward the screen in zooming from the short focus end configuration to a long focus end configuration.

12. A projection lens apparatus according to claim 9, wherein if the focal length of the ith lens group is fi, and the distance between principal points of the ith and i+1th lens groups when the projection lens apparatus is positioned at the short focus end configuration is eiw, then the following conditions are satisfied:

$0.5<-f1/f2<1.7,$ $0.5<-f1/fw<2,$ $0.5<f2/fw<1.5,$ $0.5<f3/fw<4.1,$ and $0.3<e1w/fw<2.$ 13. A projection lens apparatus according to claim 9, wherein said third lens group comprises a single lens.

14. A projection lens apparatus according to claim 13, wherein if the radiuses of curvature of surfaces of said third lens group on a first conjugate point side and on a second conjugate point side of said projection lens apparatus are R3f and R3r, respectively, then the following condition is satisfied:

$$-3.1 < \frac{R3f+R3r}{R3f-R3r} < -0.3.$$

15. A projection lens apparatus according to claim 9, wherein said first lens group comprises, in order from a first conjugate point side of said projection lens apparatus, at least one negative meniscus lens having a convex surface on the first conjugate point side, and a positive meniscus lens having a convex surface on the first conjugate point side.

16. A projection lens apparatus according to claim 15, wherein said second lens group comprises, in order from the first conjugate point side, a positive lens having two convex lens surfaces, at least one negative lens and at least one positive lens.

17. A projection lens apparatus according to claim 16, wherein if the averages of the refractive indexes of the materials of the negative and positive lenses in said first lens group are N1n and N1p, respectively, and if the averages of the refractive indexes of the materials of the negative and positive lenses in said second lens group are N2n and N2p, respectively, then the following conditions are satisfied:

$N1n < 1.7,$ $1.7 < N1p,$ $1.6 < N2n < 1.8,$ and $N2p < 1.7.$

18. A projection lens according to claim 9, wherein a fixed aperture is provided between said second lens group and said third lens group.

* * * * *

UNITED STATES PATENT AND TRADEMARK OFFICE
CERTIFICATE OF CORRECTION

PATENT NO. : 5,550,679
DATED : August 27, 1996
INVENTOR(S) : SABURO SUGAWARA

It is certified that error appears in the above-indentified patent and that said Letters Patent is hereby corrected as shown below:

<u>Column 3</u>,
    line 14, "5A-5D" should read --5A-5D, and--; and
    line 16, "7A-7-D," should read --7A-7D,--.

Signed and Sealed this

Seventh Day of January, 1997

Attest:

BRUCE LEHMAN

Attesting Officer     Commissioner of Patents and Trademarks